(12) United States Patent
Shumate et al.

(10) Patent No.: US 8,141,594 B2
(45) Date of Patent: Mar. 27, 2012

(54) PIPE INSULATION PRODUCTS AND METHODS

(75) Inventors: Monroe William Shumate, Littleton, CO (US); Derek Cooper Bristol, Littleton, CO (US)

(73) Assignee: Johns Manville, Denver, CO (US)

( * ) Notice: Subject to any disclaimer, the term of this patent is extended or adjusted under 35 U.S.C. 154(b) by 77 days.

(21) Appl. No.: 12/855,868

(22) Filed: Aug. 13, 2010

(65) Prior Publication Data

US 2012/0037258 A1 Feb. 16, 2012

(51) Int. Cl.
*F16L 9/14* (2006.01)
*B32B 17/02* (2006.01)

(52) U.S. Cl. ....... 138/149; 138/151; 138/156; 428/34.5; 428/35.9

(58) Field of Classification Search ................... 138/149, 138/151, 156, DIG. 1; 428/34.2, 34.5, 35.9, 428/354
See application file for complete search history.

(56) References Cited

U.S. PATENT DOCUMENTS

| | | | | |
|---|---|---|---|---|
| 3,442,750 A | * | 5/1969 | Wilcox | 428/109 |
| 4,022,248 A | * | 5/1977 | Hepner et al. | 138/141 |
| 4,213,487 A | * | 7/1980 | Funk et al. | 138/149 |
| 4,243,453 A | * | 1/1981 | McClintock | 156/152 |
| 4,595,615 A | * | 6/1986 | Cohen | 428/34.2 |
| 4,606,957 A | * | 8/1986 | Cohen | 428/40.9 |
| 4,780,347 A | * | 10/1988 | Cohen | 428/34.2 |
| 4,842,908 A | * | 6/1989 | Cohen et al. | 428/34.2 |
| 4,980,205 A | * | 12/1990 | Haskell | 427/294 |
| 5,104,701 A | * | 4/1992 | Cohen et al. | 428/34.5 |
| 5,516,580 A | * | 5/1996 | Frenette et al. | 442/153 |
| 5,776,841 A | * | 7/1998 | Bondoc et al. | 442/320 |
| 5,783,268 A | * | 7/1998 | Noonan et al. | 428/34.5 |
| 6,270,865 B1 | * | 8/2001 | Noonan et al. | 428/34.5 |
| 6,953,512 B2 | * | 10/2005 | Cohen et al. | 156/248 |
| 7,749,923 B2 | * | 7/2010 | Moore et al. | 442/23 |
| 2004/0137181 A1 | * | 7/2004 | Ruid et al. | 428/36.91 |
| 2010/0229997 A1 | * | 9/2010 | Moore et al. | 138/149 |

* cited by examiner

*Primary Examiner* — Patrick F Brinson
(74) *Attorney, Agent, or Firm* — Robert D. Touslee

(57) ABSTRACT

A pipe insulation product including a core of insulating material and a roughly rectangular laminate. The core may include an outer surface; an inner surface; and a wall extending between the outer and inner surfaces. The laminate may include a foil or metallized polymeric film sheet, a scrim, a paper media sheet, and a polymeric film sheet bonded together via an adhesive. The laminate may include a closure flap that adhesively seals opposite ends of the laminate together to form a cylindrical tube with the core enclosed therein. The paper media sheet may be between the range of 20 and 40 pounds per 3000 square feet to provide greater closure flap seal integrity without significantly reducing one or more beneficial properties of the laminate.

20 Claims, 4 Drawing Sheets

| Pipe Section Short (4") | Closure Pressure | Closure Temp | Cond temp | Poly Laminate (45lb) | | | Poly Laminate (30lb) | | |
|---|---|---|---|---|---|---|---|---|---|
| | | | | 1 Day | 9 Days | 18 Days | 1 Day | 9 Days | 18 Days |
| Wedge | hand | 20 | 10 | 5 | 4 | 5 | 5 | 5 | 5 |
| Wedge | hand | 70 | 10 | 5 | 5 | 5 | 5 | 5 | 5 |
| Standard | hand | 20 | 70 | 4 | 3 | 3 | 4 | 4 | 4 |
| Wedge | hand | 20 | 70 | 3 | 2 | 2 | 4 | 4 | 4 |
| Standard | Squeegee | 20 | 70 | 1 | 1 | 1 | 4 | 4 | 4 |
| Standard | hand | 70 | 70 | 4 | 4 | 4 | 5 | 5 | 5 |
| Wedge | hand | 70 | 70 | 4 | 3 | 3 | 4 | 4 | 4 |
| Standard | Squeegee | 70 | 70 | 4 | 4 | 4 | 4 | 4 | 4 |
| Wedge | Squeegee | 70 | 70 | 4 | 4 | 4 | 5 | 5 | 5 |
| Standard | hand | 20 | 150 | 2 | 1 | 1 | 4 | 4 | 4 |
| Wedge | hand | 20 | 150 | 1 | 1 | 1 | 4 | 4 | 4 |
| Standard | Squeegee | 20 | 150 | 4 | 3 | 3 | 4 | 4 | 3 |
| Wedge | Squeegee | 20 | 150 | 2 | 2 | 2 | 4 | 3 | 3 |
| Standard | hand | 70 | 150 | 2 | 2 | 2 | 4 | 4 | 4 |
| Wedge | hand | 70 | 150 | 2 | 2 | 2 | 4 | 4 | 4 |
| Standard | Squeegee | 70 | 150 | 4 | 4 | 4 | 4 | 3 | 3 |
| Wedge | Squeegee | 70 | 150 | 4 | 4 | 4 | 5 | 4 | 4 |

FIG. 3

PIPE INSULATION PRODUCTS AND METHODS

CROSS-REFERENCES TO RELATED APPLICATIONS

This application is related to the following Non-Provisional U.S. Patent Applications: U.S. patent application Ser. No. 12/855,876 filed on Aug. 13, 2010 by Shumate, entitled "Systems and Methods for Insulating a Pipe;" U.S. patent application Ser. No. 12/855,833 filed on Aug. 13, 2010 by Shumate et al., entitled "Insulation Product with Inward Curling Closure Flap;" and U.S. patent application Ser. No. 12/855,856 filed on Aug. 13, 2010 by Shumate et al., entitled "Pipe Insulation Product with Charge Dissipator."

The entire disclosures of all of the aforementioned Non-Provisional U.S. Patent Applications are hereby incorporated by reference, for all purposes, as if fully set forth herein.

BACKGROUND OF THE INVENTION

The subject invention relates generally to pipe insulation products and more specifically to pipe insulation products comprising an insulating material core enclosed within a laminate jacket.

Piping is often used to transport one or more fluids between destinations. For example, piping may be used to transport water, petroleum, oxygen, etc. The piping is often made from a metal material, such as copper, stainless steel, galvanized steel, aluminum, brass, titanium, etc., or from a plastic material, such as polyvinyl chloride (PVC), chlorinated polyvinyl chloride (CPVC), fiber reinforced plastic (FRP), polypropylene (PP), polyethylene (PE), etc. Piping may also be made from a ceramic, fiberglass, or concrete material, although these pipes are less common.

During fluid transportation, the fluid may be subjected to heating and/or cooling from the surrounding environment. For example, the fluid may be transported in either a hot or cold state relative to the surrounding environment, which induces heat transfer to or from the fluid and pipes. HVAC systems are a common example of systems that routinely utilize various pipe configurations to transport hot or cold fluids. Due to the conductive nature of the pipes (especially metal pipes), heat may be conducted to or from the fluid during transportation. The addition or removal of heat may result in the decreased efficiency of a system and/or increased time and/or expense in operating the system. For example, in HVAC systems, the addition of heat to cooled fluids may result in loss of efficiency for a cooling unit and may also result in increased expense because of increased operating time and energy needed to achieve a desired cooling level.

To reduce heat transfer during fluid transportation, pipe insulation products are commonly installed on one or more sections of pipes to retard the flow of heat to or from the pipes. Commonly, one or more sections of pipe are fitted with a pipe insulation product where the sections of pipe are generally fully encased within the pipe insulation product. Separate sections of pipe insulation product are often coupled together via adhesive tapes. The outer surface of the pipe insulation product is often designed to enhance the visual appeal of the piping system and serve as a means for sealing the pipe insulation product about the pipes of the piping system. In addition, the various layers of the pipe insulation product often serve one or more important functions (e.g., restricting water vapor transmission; resisting mold, mildew, and/or fungal growth; providing puncture resistance, tensile strength, and/or durability; resisting UV, handling, environmental, and/or shipping damage, etc.).

To perform some of these functions, it is critical that the outer layer of the pipe insulation product be sealed and remain sealed over the life of the pipe insulation product. For example, the pipe insulation product may include one or more layers that restrict the transmission of water vapor or other environmental contaminants through the laminate. Generally, a pipe insulation product is required to have a water vapor transmission rate of no greater than 0.02 perms. If the pipe insulation product is not able to seal and/or remain sealed over the life of the product, the layer that functions as a water vapor barrier or retarder may be compromised or circumvented because water vapor and/or other contaminants may freely flow through the unsealed portion of the pipe insulation product.

Leakage of water vapor and/or other contaminants into the pipe insulation product's interior may cause a variety of problems for the insulated pipe and/or surrounding objects including: condensation of water on the pipes; mold, mildew, or fungal growth; pipe corrosion or degradation; staining of the pipe insulation product and/or surrounding objects; water drip damage; loss of the pipe insulation product's insulating value, etc. Hence, the integrity of the pipe insulation product's seal is critically important to the functionality of the pipe insulation product.

BRIEF SUMMARY OF THE INVENTION

One embodiment of the present invention may include a pipe insulation product for insulating a pipe and/or providing one or more other beneficial properties. The pip insulation product may include a tubular core of insulating material. The tubular core may include a length and a longitudinal axis, a substantially cylindrical outer surface, a substantially cylindrical inner surface, and a wall extending between the cylindrical outer surface and the cylindrical inner surface. The wall of the tubular core may have a radially extending thickness and a slit extending completely through the wall to the cylindrical inner surface where the slit extends parallel to the longitudinal axis of the tubular core for the length of the tubular core.

The pipe insulation product may also include a laminate that is roughly rectangular in shape and that is coextensive with and bonded to the substantially cylindrical outer surface of the tubular core. The laminate may be flexible so that the tubular core and laminate can be opened, placed about a pipe, and closed without degrading the laminate. The laminate may include a polymeric film sheet that forms an outer exposed layer of the laminate. The laminate may include a closure flap that is configured to adhesively seal opposite sides of the laminate so that the laminate forms a substantially cylindrical tube with at least a portion of the tubular core enclosed therein. The laminate may also include a foil or metallized polymeric film sheet that provides a fluid vapor barrier to minimize fluid vapor transmission through the laminate. The foil or metallized polymeric film sheet may form an inner layer of the laminate and may be bonded to the cylindrical outer surface of the tubular core.

The laminate may further include a scrim that includes a a mesh of a plurality of fibers. The laminate may additionally include a paper media sheet that is between the range of 20 and 40 pounds per 3000 square feet to provide greater closure flap seal integrity without significantly reducing one or more beneficial properties of the laminate. In some embodiments, the paper media sheet may be between the range of 27 and 33 pounds per 3000 square feet. The scrim and paper media sheet may be positioned between the foil or metallized polymeric film sheet and the polymeric film sheet. The laminate may additionally include an adhesive that bonds the polymeric film sheet, the foil or metallized polymeric film sheet, the scrim, and the paper media sheet together.

The one or more beneficial properties of the laminate may include: puncture resistance, tensile strength in a circumferential direction, tensile strength in a longitudinal direction, handling damage resistance, fire and smoke propagation resistance, and mold, mildew, or fungal growth resistance. The paper media sheet may include kraft paper. The polymeric film sheet may include: polypropylene, polyethylene, polyvinyl chloride, vinyl, saran, polyethylene terephthalate, or thermoplastic polyolefin. According to one embodiment, the pipe insulation product may be fitted about a hollow roughly cylindrical pipe that has an outer diameter that corresponds to the cylindrical inner surface of the tubular core.

According to another embodiment, the present invention may include a roughly rectangular laminate for a pipe insulation product. The laminate may include a polymeric film sheet that forms an outer exposed layer of the laminate. The laminate may include a closure flap that is configured to adhesively seal opposite sides of the laminate so that the laminate forms a substantially cylindrical tube. The laminate may also include a foil or metallized polymeric film sheet that provides a fluid vapor barrier to minimize fluid vapor transmission through the laminate.

The laminate may further include a scrim having a mesh of a plurality of fibers. The laminate may additionally include a paper media sheet that is between the range of 25 and 35 pounds per 3000 square feet to provide greater closure flap seal integrity without significantly reducing one or more beneficial properties of the laminate. The laminate may additionally include an adhesive that bonds the polymeric film sheet, the foil or metallized polymeric film sheet, the scrim, and the paper media sheet together.

According to another embodiment, the present invention may include a method for producing a roughly rectangular laminate jacket for a pipe insulation product. The method may include providing a foil or metallized polymeric sheet. The foil or metallized polymeric sheet may form an inner layer of the laminate and may provide a fluid vapor barrier to minimize fluid vapor transmission through the laminate. The method may also include providing a polymeric sheet material. The polymeric sheet material may form an outer exposed layer of the laminate. The laminate jacket may include a closure flap that is configured to adhesively seal opposite sides of the laminate jacket so that the laminate forms a hollow cylindrical tube.

The method may further include providing a scrim. The scrim may include a mesh of a plurality of fibers and may be positioned between the foil or metallized polymeric sheet and the polymeric sheet outer layer. The method may additionally include providing a paper media sheet material. The paper media sheet material may be between the range of 25 and 35 pounds per 3000 square feet to provide greater closure flap adhesive seal integrity without degrading one or more beneficial properties of the laminate. The method may additionally include bonding, via an adhesive, the foil or metallized polymeric sheet material, the scrim, the paper media sheet material, and the polymeric sheet material together to form the laminate jacket.

The method may additionally include positioning a tubular core of insulating material relative to the laminate so that the tubular core can be wrapped or encased within the laminated. The method may additionally include bonding the laminate and tubular core together to form the pipe insulation product.

The pipe insulation product may be flexible so that the tubular core and laminate can be opened, placed about a pipe, and closed without degrading the laminate jacket. The method may additionally include fitting the pipe insulation product about a pipe to insulate and/or protect the pipe.

BRIEF DESCRIPTION OF THE DRAWINGS

FIG. 3 is a table illustrating closure flap failure data for laminates under various conditions.

DETAILED DESCRIPTION OF THE INVENTION

Figure 1:
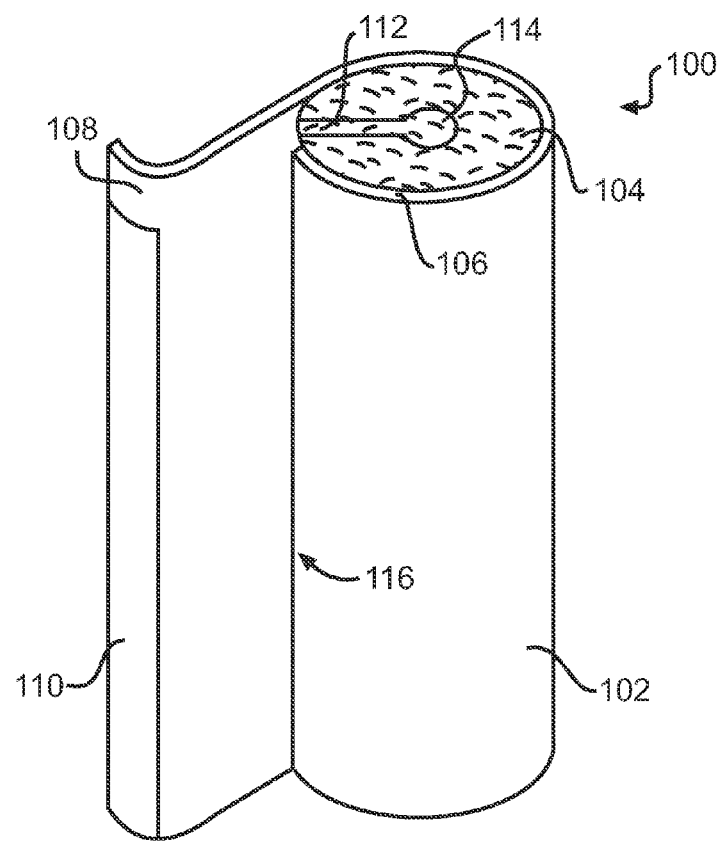
FIG. 1 is a schematic perspective view of a pipe insulation product that includes a core of insulating material encased within a laminate jacket.

The present invention includes a pipe insulation product that may be used to insulate a pipe and to provide one or more other beneficial properties. For example, the pipe insulation product may serve an aesthetic purpose when fitted about pipe sections. Pipe insulation products are often designed to provide a smooth, finished, and visually appealing outer surface to enhance the visual appeal of the piping systems. In addition, the pipe insulation product may also shield or protect the pipe from one or more environmental elements (e.g., water vapor). The protection/shielding function minimizes potential risks for the pipe and/or for surrounding objects (e.g., minimizes condensation of water on the pipes; mold, mildew, and/or fungal growth; water drip damage; loss of the pipe insulation product's insulating value; etc.). To minimize these risks, it is critical that the outer layer of the pipe insulation product be sealed and remain sealed over the life of the pipe insulation product. Further, the pipe insulation product must readily adapt to a wide variety of different climates and conditions in which the products are often used and/or installed (e.g., hot, cold, humid, dry, etc.).

Pipe insulation products typically include a tubular core of insulating material surrounded by and encased within a laminate jacket or laminate. Individual segments of the pipe insulation product typically range in length from about 36 inches to about 48 inches; have a wall thickness ranging from about 0.5 inches to about 3 inches; and a range in outside diameter from about 2 inches to about 32 inches. In addition, the laminate may include one or more layers that provide various beneficial characteristics or properties that enhance the performance of the pipe insulation product. For example, the laminate may include a foil layer that reduces the transmission of water vapor and/or other contaminants through the laminate. The failure of the pipe insulation product to seal and/or remain sealed may compromise or circumvent the laminate's water/contaminant barrier function because water vapor and/or other contaminants may freely flow through the unsealed portion of the laminate.

In some instance, the configuration of the pipe insulation product may contribute to the inability of the pipe insulation product to seal and/or remain sealed. For example, laminates may include a plurality of layers that each perform specific functions. The inclusion of additional layers may impede the ability of the pipe insulation product to seal and/or remain sealed due to an increase in stiffness and/or rigidity of the pipe insulation product (e.g., newer laminates may include an additional polymeric material outer layer). Further, differing climates and conditions that the pipe insulation product may be subjected to, and therefore must adapt to, may increase the likelihood that a pipe insulation product's seal will fail. Failure of the pipe insulation product to remain sealed may result in the exposure of the insulated pipe and/or the insulating material to one or more environmental elements (e.g., water vapor), which may have serious consequences, such as those described herein.

Additionally, changing the laminate's design to improve the seal may dramatically affect other characteristics or properties of the pipe insulation product. For example, laminates often include a 45 lb kraft paper to attain one or more of the following characteristics or properties: increased durability, increased handling damage resistance, increased tensile strength, increase puncture resistance, increased visual appearance (i.e., smooth, uniform surface), etc. In addition, laminates often include specific fibers, fiber spacing, and/or fiber orientation for similar reasons and/or include one or more additive types and/or additive amounts to provide one or more enhancements (e.g., resistance to flame and smoke propagation, resistance to fungal growth, etc.). Similarly, specific polymeric film outer layers may be selected to provide various characteristics or properties (e.g., protection against water vapor absorption by the kraft paper; provide a smooth, unwrinkled, visually appealing outer surface; etc.).

All these design variables (i.e., the various layers, layer adhesives, closure adhesive, etc.) must work harmoniously in order for the pipe insulation product to function properly over its lifespan. Changing one or more of these design variables may result in a non-viable product at some point during the pipe insulation product's lifespan and/or in one or more conditions or climates (i.e., may result in a visually unappealing product, a product that fails to insulate or protect a pipe, a product that is susceptible to damage, etc.). An example of the negative impact that a design variable change may have is evidenced in the pipe insulation product's increased vulnerability to sealing failure due to the inclusion of one or more additional layers as described herein. Other design variable changes may degrade one or more beneficial characteristics or properties of the pipe insulation product. These beneficial characteristics or properties may include: puncture resistance; tensile strength (in both the machine and cross machine direction); handling damage resistance (creasing); environmental damage resistance (dimpling); flame and smoke propagation resistance; mold, mildew, or fungal growth resistance; water transmission resistance; UV and visible light damage resistance; visual appeal; etc.

The present invention provides a laminate that is capable of including additional layers (i.e., a polymeric film sheet outer layer) while maintaining the integrity of the seal and while maintaining the other beneficial properties of the laminate. Additionally, the seal integrity and other beneficial properties are maintained over a wide variety of different climates and conditions to which the pipe insulation product may be exposed. In other words, a single pipe insulation product may be used in a variety of conditions because the pipe insulation product is not more prone to failure due to the condition changes.

The laminate may include a foil or metallized polymeric film sheet, a scrim, a 20-40 lb weight paper media layer, and the polymeric film sheet outer layer. In a specific embodiment, the a 25-35 lb weight paper media layer may be used. The 20-40 lb weight range of the paper media layer provides the increased seal integrity while maintaining the other beneficial properties of the pipe insulation product. Using a paper media layer with a paper weight of less than 20 lbs may result in serious degradation of one or more beneficial properties of the pipe insulation product (e.g., flame and smoke propagation resistance, tensile strength, puncture resistance, etc.). On the other hand, using a paper media layer with a paper weight greater than 40 lbs may result in failure of the pipe insulation product to seal or remain sealed over the pipe insulation product's lifespan. These and other advantages of the present invention will become more evident with reference to the figures.

As shown in FIG. 1, a pipe insulation product 100 may include a tubular core of insulating material 104 that may include a substantially cylindrical outer surface (i.e., the outside of the tubular core that directly contacts the laminate) and a substantially cylindrical inner surface 114. Extending between the cylindrical outer surface and the cylindrical inner surface 114 may be a wall of insulating material. The insulating material provides the insulating properties of the pipe insulation product 100. In one embodiment, the insulating material may be a fibrous material (e.g., fiberglass, mineral wool, refractory ceramic fiber, chopped strand fiber glass, etc.). In other embodiments the insulating material may be a foam (e.g., phenolic foam, polyisocyanurate, polyolefin, polystyrene, polyurethane), a polymer, foam glass, microporous insulation (e.g., Microtherm®), or any other material that provides insulation.

The cylindrical inner surface 114 may be configured to correspond with a specific pipe outer diameter (e.g., ½ inch, 1 inch, etc.). The tubular core 104 may also include a longitudinally extending slit 112 that passes completely through the wall of insulating material on one side and into the interior of the substantially cylindrical inner surface 114 so that the tubular core 104, and thus, the pipe insulation product 100, can be opened, passed over, and closed about a pipe.

Circumferentially surrounding and encasing the tubular core 104 is a laminate jacket or simply a laminate 102. The laminate 102 has a thickness 106 that includes one or more layers of various materials as described below. The laminate 102 is roughly co-extensive with the tubular core 104 and bonded to the cylindrical outer surface. The laminate 102 may be positioned so that a longitudinal edge portion 116 extends parallel and adjacent to the slit 112, but does not overlap the slit 112. The laminate 102 includes a closure flap 108 that may have a pressure sensitive adhesive layer 110 so that the laminate 102 may be adhesively sealed in a closed position fully encasing the tubular core 104 within the laminate 102. The laminate may be sealed by folding or overlapping the closure flap 108 over the longitudinal edge portion 116 of the laminate 102 and by applying pressure to the pressure sensitive adhesive layer 110 so that the closure flap 108 adhesively seals to the outer surface of the overlapped portion of the laminate 102.

In some embodiments, the closure flap 108 may curl outward, meaning that the closure flap 108 curls away from the closed position. In such embodiments, the outward curl must be overcome in order to adhesively seal the closure flap 108 to the laminate's outer surface. The outward curl or the outward bias of the closure flap 108 may impart a lifting force on the adhesive material after the closure flap 108 is sealed, which may cause the closure flap 108 to become unsealed at some time during the laminate's 102 lifetime (i.e., the outward curl may cause the closure flap 108 to peel back away from the sealed position). The closure flap's tendency to unseal or peel back may be enhanced under some environmental conditions and/or may be enhanced as those conditions change (i.e., unsealing may be accelerated due to high heat and humidity, due to repeated change from high to low temperatures, etc.). The outward curl may be due to the stiffness of the paper media layer, the polymeric film sheet layer, internal stresses within the laminate, etc.

In other embodiments, the closure flap 108 may not have an outward curl, but may be biased toward a straight or flat position due to the stiffness of the laminate and/or one or more layers of the laminate (i.e., the paper media layer). As additional layers are added to the laminate, the stiffness may increase, which may cause and/or enhance the closure flap 108 sealing problems discussed herein. The stiffness or bias toward a flat or straight position may cause the closure flap 108 to become unsealed and/or peel back away from the sealed position.

The closure flap 108 may include a removable silicone treated release strip (not shown) removably adhered to the pressure sensitive adhesive layer 110 to protect the adhesive material from degradation prior to installation. Maintaining a sealed closed position is a critical function of the closure flap 108 and adhesive layer 110 so that the insulated pipe and/or insulating material are not subjected to one or more environmental elements, such as water vapor. If the closure flap 108 is not able to seal or remain sealed (e.g., the closure flap 108 curls backward after being adhered to the laminate's outer surface), then water vapor and/or other contaminants may flow between the closure flap 108 and longitudinal edge portion 116 and thereby leak or pass into the interior of the pipe insulation product (i.e., pass to the encased pipe and insulating material). Water vapor and/or other contaminants that pass into the laminate's interior may cause condensation of water on the pipes; pipe corrosion or degradation; mold, mildew, and/or fungal growth; water drip damage; staining of the laminate and/or surrounding objects; loss of the pipe insulation product's insulating value; etc.

The laminate 102 may include one or more flame retardants, fungi growth inhibiting agents, charge dissipators, and/or other additives to enhance the performance of the laminate. Additionally, butt strips (not shown) may be used to connect individual segments of the pipe insulation product end to end. The butt strips may be strips of adhesive material (i.e., tape) that are substantially impermeable to fluid vapors to greatly restrict or eliminate the transmission of water vapor through the butt strips (i.e., the butt strips seal end segments of the pipe insulation product 100 together). The butt strip's ability to seal the end segments may also be compromised due to the closure flap's tendency to peel back or unseal.

Figure 2:
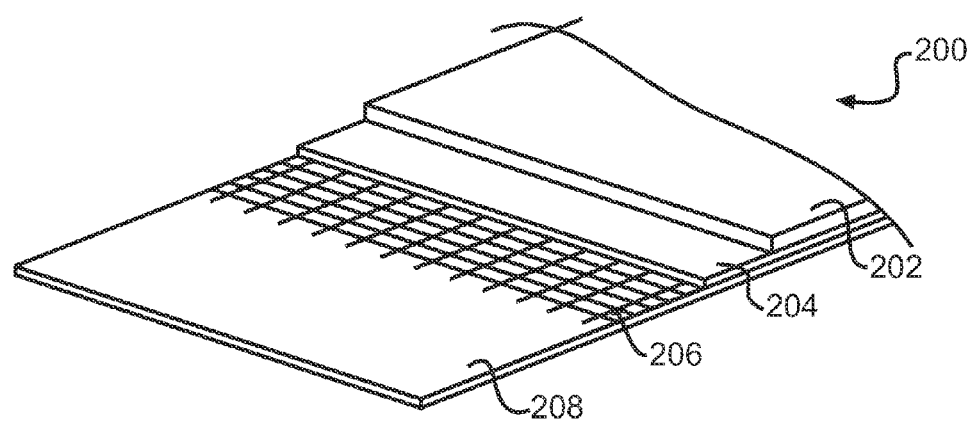
FIG. 2 is a schematic perspective view of a laminate jacket according to one embodiment of the present invention with portions of the laminate broken away to show the various layers of the laminate.

FIG. 2 depicts a laminate jacket 200 according to one embodiment of the present invention. FIG. 2 shows portions of the laminate 200 broken away to reveal the various layers of the laminate. The laminate 200 may include an inner layer composed of a foil or metallized polymeric film sheet 208. Preferably, the laminate 200 includes an inner layer that is made of aluminum foil or metallized polyethylene terphthalate (MPET) between about 0.48 mils and about 100 mils in thickness (between about 48 and 100 gauge in thickness). The inner layer aluminum foil or MPET provides a nearly impermeable fluid vapor barrier to fluids that are external to and surrounding the pipe insulation product. For example, the foil or metallized polymeric film sheet 208 is nearly impermeable to water vapor, which protects the insulated pipe from water condensation, corrosion, loss of insulating value, mold growth, etc. The foil or metallized polymeric film sheet 208 enables the laminate 200 to provide a water vapor transmission rate of less than 0.02 perms.

By using the foil or metallized polymeric film sheet 208, fluid may be passed through the insulated pipe and one or more environmental elements (e.g., water vapor) in the surrounding environment may be restricted (or kept) from penetrating through laminate to the pipe. When cold fluid is passed through the pipe, the foil or metallized polymeric film sheet 208 prevents water vapor from condensing on the pipes and causing the associated problems described above. If the closure flap 108 becomes unsealed, however, the water vapor barrier is circumvented as water vapor may freely flow between the unsealed portion of the laminate. Although the foil or metallized polymeric sheet 208 is described as the inner layer of the laminate 200, the foil or metallized polymeric sheet 208 may be positioned anywhere within the laminate (e.g., immediately adjacent the polymeric sheet outer layer).

The laminate 200 also includes a polymeric film sheet outer layer 202. The polymeric film sheet 202 may be made of polypropylene, polyethylene, polyvinyl chloride, vinyl, saran, polyethylene terephthalate, thermoplastic polyolefin, etc. The polymeric film material may be selected as the laminate's outer layer 200 to provide one or more of the following advantages: shielding the porous media sheet 204 and/or insulating material from water vapor absorption; protecting against UV damage; protecting against mold, mildew, or fungal growth; providing a smooth, unwrinkled, visually appealing outer surface; etc. Polymeric film materials generally provide a smoother, more visually appealing outer surface when compared with traditional laminates.

Disposed between the foil or metallized polymeric film sheet 208 and the polymeric film sheet outer layer 202 may be a scrim 206 and paper media sheet 204. In some embodiments the scrim 206 and paper media sheet 204 may be replaced by a single, preferably porous, material. The scrim 206 may function to reinforce and strengthen the laminate 200 and thereby provide increased tensile strength, puncture resistance, etc. The scrim 206 may be made of fiberglass reinforcing yarn, such as but not limited to a G75 or H110 yarn. In addition, the yarn may be configured to be from 2 to 6 strands per inch in both the machine and cross machine direction, with a typical scrim being about 5 strands per inch in both directions. In some embodiments the scrim 206 may be made of polyester strings or any other synthetic string. The scrim 206 may be positioned immediately adjacent to the foil or metallized polymeric sheet 208 or may positioned anywhere else within the laminate (i.e., may be positioned immediately adjacent the polymeric sheet outer layer 202).

The paper media sheet material 204 may be positioned immediately adjacent to the scrim 204, the foil or metallized polymeric sheet 208, or the polymeric film sheet outer layer 202. The paper media sheet 204 may preferably be a kraft paper that is between about 25 and 35 pounds/3000 square feet and may include one or more additives to enhance the performance of the laminate 200 (e.g., fire retardant additives and/or anti-microbial agents to prevent mold or fungal growth and prevent propagation of smoke and/or fire). In one specific embodiment, the kraft paper may be roughly 30 pounds/3000 square feet.

Traditional laminates often use a heavier weight paper, typically 40-45 pounds/3000 square feet. The heavier weight paper is generally chosen because such papers provide several advantages over lighter weight papers. For example, heavier weight papers provide several structural advantages including increased durability, support, tensile strength, puncture resistance, handling damage resistance, environmental damage resistance, shipping damage resistance, etc. These advantages facilitate handling, transporting, cutting, installing, and general durability of the pipe insulation product. The heavier weight papers also provides several aesthetic benefits. For example, the thicker/heavier the paper media layer, the nicer, smoother, and more abuse resistant the outer surface becomes (i.e., heavier weight papers provide an increased visually appealing surface). In addition, heavier paper media layers more easily mask imperfections on the laminate's outer surface.

Likewise, the heavier weight papers provide a thicker porous media layer that may be used to absorb and retain one or more additives. The porous nature of the paper media sheet 204 facilitates in absorbing and retaining one or more of the additives within the paper media layer, and hence, within the laminate, which may increase the laminate's performance. For example, one or more of the pipe insulation product's layers may be a potential fuel source for a fire and/or may be susceptible to mold or fungal growth (e.g., paper media material, polymeric film material, etc.). Because the paper media sheet 204 may absorb and retain one or more additives, these risks are greatly reduced with the inclusion of the proper type and amount of additives within the paper media sheet 204. The paper media sheet 204 may be the only layer within the laminate that is capable of absorbing and retaining these additives. Thus, the paper media sheet 204 may be critical to ensuring that the laminate 200 is not prone to flame and smoke propagation, fungal growth, and other concerns. The additives may be included within the adhesive material that bonds the various layers of the laminate together. Alternatively or additionally, the paper media sheet 204 may be pre-saturated with one or more additives.

A disadvantage of the heavier weight papers is that with the inclusion of the additional layers (e.g., the polymeric film sheet outer layer), the laminate 200 increases in stiffness and rigidity and becomes prone to closure flap seal failure as described above. The problem may be enhanced depending on the climate and conditions the laminate 200 is subject to and/or may be enhanced because the polymeric film sheet provides a smoother lower energy surface for the adhesive material to bond with.

Closure flap failures may be difficult to remedy. For example, applying an additional quantity of adhesive may not remedy the problem because the adhesive material begins to "cobweb," or in other words form strands or fingers between the closure flap and the polymeric film outer surface, which allows the closure flap to peel back and unseal. Likewise, the problem may not be remedied by changing the type of adhesive. Further, varying the foil or metallized polymeric film sheet is generally limited due to the design constraints, such as maintaining the laminate's perm rating. In addition, varying the paper weight may negatively affect one or more of the beneficial properties of the paper media layer described above. For example, a paper weight that is too light may result in a laminate that is unacceptably prone to flame and smoke propagation, fungal growth, tearing, puncturing, handling damage, environmental damage, etc. and/or that is visually unappealing.

Figure 4:
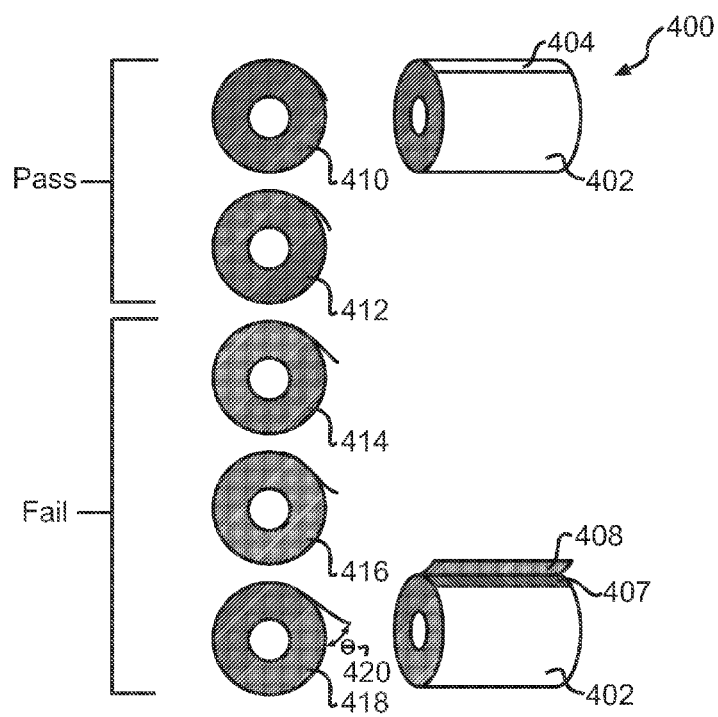
FIG. 4 is a schematic view illustrating various degrees of failure of a laminate jacket's closure flap.
Figure 5:
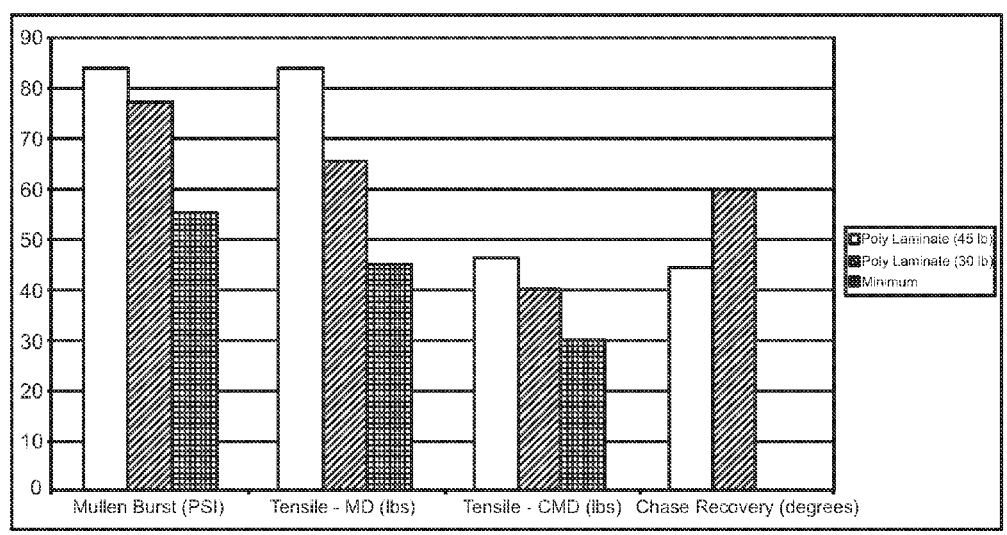
FIG. 5 is a graph comparing various beneficial properties of two laminates.

As shown in FIGS. 3-5, a paper weight of between 25 and 35 pounds/3000 square feet allows the laminate to seal and remain sealed (i.e., maintains the seal's integrity) without significantly degrading the beneficial characteristics or properties of the laminate. Further, a laminate comprising a paper media layer between 25 and 35 pounds/3000 square feet is able to maintain the closure flap seal and beneficial properties over a wide range of different climates and conditions, meaning that a single pipe insulation product including the 25-35 lb paper media may be capable of being used in virtually any situation without increased risk of closure flap sealing failure (i.e., the closure flap's seal integrity is maintained over a wide rang of climates and conditions). A paper weight that is roughly 30 pounds/3000 square feet provides an improved level of seal integrity vs. beneficial laminate properties. The advantages of the specific paper media material range are more apparent with reference to FIGS. 3-5.

The foil or metallized polymeric film sheet 208, the scrim 206, the paper media sheet 204, and the polymeric film sheet 202 may be bonded or adhered together using one or more adhesives (not shown). The adhesive or adhesives used may be contact type, pressure sensitive, heat seal, etc. and may include one or more additives to enhance the performance, dimensional stability, moisture resistance, handleability, fire and smoke propagation resistance, and/or durability of the laminate 200. Examples of adhesives that can be used include, but are not limited to, melamine, urea formaldehyde, phenolic, polyurethane, acrylic, latex, and acrylo-nitrile. Additional adhesives that can be used include adhesives that can migrate into the paper media sheet 204 to improve the physical characteristics of the laminate 200 (e.g., improve UV stability, flame spread resistance, mold growth resistance, etc.). Examples of such migrating adhesives are colloidal silica or alumina, sodium or potassium silicate, ammonium phosphate stabilized with zinc oxide, magnesia or alumina; borax, and oxi-chloride stabilized with zinc oxide or magnesia.

FIG. 3 depicts a table that provides closure flap failure data for laminates under various climates and conditions. The scores (i.e., 1-5) for each polymeric film outer layer laminate (i.e., 45 lb & 30 lb poly laminate) in the table correspond to the numbered pipe insulation products depicted in FIG. 4 and show varying degrees of closure flap failure. A brief description of the varying degrees of closure flap failure will be provided to clarify the data provide in the table of FIG. 3.

FIG. 4 illustrates a variety of pipe insulation products 400 having varying degrees of closure flap failure 410-418. The varying degrees of closure flap failure may be quantified by measuring an distance θ (420) between the closure flap and the outer surface of the laminate as the closure flap lifts or pulls away from the laminate's outer surface. Laminates 4 and 5, 412 & 410 respectively, correspond to scores 4 and 5 in the table of FIG. 3. As indicated, a score of 4 or 5 indicates a laminate that has a sufficient closure flap seal integrity after the testing period (i.e., the laminate "passes" the seal integrity test). These scores indicate that the closure flap has experienced no lifting (i.e., a score of 5) or very minimal lifting where the distance θ is less than 1/32 of an inch from the outer surface of the laminate (i.e., a score of 4). These scores also indicate that the interior of the pipe insulation product (i.e., the pipe and/or insulating material) are sufficiently shielded from environmental contaminants.

Laminate 3, 414, corresponds with a score of 3 in the table of FIG. 3. A score of 3 or less represents a failure of the closure flap to remain sealed (i.e., the laminate "fails" the seal integrity test), which may result in the pipe and/or insulating material being exposed to one or more contaminants (e.g., water vapor) that may cause damage to the insulated pipe, laminate jacket, and/or surrounding objects as previously described. A score of 3 indicates that the closure flap has lifted to where the distance θ from the edge of the closure flap to the laminate's outer surface is between 1/32 and 1/8 of an inch. A laminate with a score of 3, however, may be serviceable in some conditions.

Laminates 1 and 2, 418 and 416 respectively, correspond with a score of 1 and 2 in the table of FIG. 3. A score of 2 or less represents a catastrophic failure of the closure seal where there is very little to no adhesive material sealing the closure flap to the outer surface of the polymeric film sheet (i.e., a score of 1) or where the closure flap has experienced significant lifting so that the distance θ from the edge of the closure flap to the laminate's outer surface is greater than ⅛ of an inch. A score of 1 or 2 indicates virtually no, or very little, protection for the laminate's interior, or in other words, indicates a substantial likelihood that the pipe and insulating material will be exposed to water vapor and/or other contaminants, which may result in water condensation, corrosion, and/or damage as described previously.

A perspective view of laminates 1 and 5 is provided to further show the variation in the closure flap failure. The perspective view of laminate 5 shows the closure flap 404 tightly adhered to the outer surface of the laminate 402. In contrast, the perspective view of laminate 1 shows the closure flap 408 completely detached from the outer surface of the laminate 406 so that a portion of the insulation material 407 is completely exposed to the surrounding environment.

Referring back to the table in FIG. 3, the figure provides test data for two polymeric film laminates: a laminate using a 45 lb paper media layer and a laminate using a 30 lb paper media layer. The closure flap seal integrity was tested over a wide range of conditions (e.g., closure temperature from 20-70 degrees Fahrenheit and condition temperatures from 10-150 degrees Fahrenheit), using a range of pipes and closure pressures, and over differing periods of time (e.g., 1-18 days). In each of the tests, the only differing variable is the weight of the paper media layer. All of the failures are highlighted in the table.

As shown in the table, the substitution of the 30 lb paper media for the traditional 45 lb paper media had a dramatic effect on the integrity of the closure flap seal to remain sealed. The 45 lb paper media experienced 27 failed seals out of 51 tests or a roughly a 53% failure rate. Of the 27 failures, 20 were catastrophic failures (i.e., a score of 1 or 2) or roughly 74% of the failures were catastrophic (roughly a 39% catastrophic failure rate overall). Similarly, 41% of the seals failed after 1 day (7 out of 17), with 86% of these failures being catastrophic.

In contrast, the laminate using a 30 lb paper media experienced only 5 failed seals out of 51 tests or a little under a 10% failure rate. The 30 lb paper media also experienced no catastrophic failures and experienced no failures after 1 day meaning that even the laminates that failed may be serviceable under some conditions. The dramatic improvement in seal integrity is likely due to the reduced stiffness and rigidity in the laminate as a result of the lighter weight paper media. The reduced stiffness and rigidity allow the laminate to conform more easily to the curvature of the pipe insulation product thereby reducing the lifting force exerted on the closure flap.

FIG. 5 is a graph illustrating that the reduction in weight of the paper media layer does not significantly degrade other beneficial characteristics or properties of laminate. Specifically, FIG. 5 illustrates test results for the 45 lb and 30 lb paper media laminates in relation to 4 different laminate properties: puncture resistance (mullen burst), tensile strength in the machine direction, tensile strength in the cross machine direction, and crease recovery (handling damage resistance). FIG. 5 also provides the minimum strength required for puncture resistance and tensile strength in the machine and cross machine directions (crease recovery is a measure of the laminates aesthetic value and does not have a minimum requirement).

As shown in the graph, the use of the lighter weight paper only causes a roughly 8-9% reduction in the puncture resistance of the laminate (i.e., 84 psi to 77 psi), a roughly 23% reduction in tensile strength in the machine direction (i.e., 84 lbs to 65 lbs), and a roughly 13% reduction in tensile strength in the cross machine direction (i.e., 46 lbs to 40 lbs). All of the resulting strengths of the 30 lb paper media laminate, while slightly reduced, are still significantly above the required minimums. Thus, the strength properties of the laminate are not seriously degraded by the reduction in weight of the paper media layer.

Additionally, the reduction in weight of the paper media provides an increase in the laminate's crease recovery. As shown in the graph, the 30 lb paper weight exhibited a roughly 36% increase in crease recovery (46 degree angle to 60 degree angle). Crease recovery indicates a laminate's resistance to handling damage such as dings, dents, creases, folds, impressions, imprints, etc. Decreasing the thickness of the stiff rigid paper media material allows the more flexible polymeric sheet material to absorb and recover from handling damage.

An additional benefit of the decreased paper weight is an increased resistance to flame and smoke propagation and an increased resistance to fungal growth. The paper media layer and polymeric film layer (both outer layer and inner metallized layer) may be a fuel source for a potential fire. In addition, the paper media layer may be a source for mold, mildew, or fungal growth. Reducing the weight (i.e., thickness) of the paper media material reduces both the fuel source for a potential fire and the source for fungal growth. Additionally, substituting a 30 lb paper media in place of a 45 lb paper media does not significantly reduce the amount of flame and/or fungal retardant that the paper media can absorb. Therefore, because the paper media content may be reduced while the flame and/or fungal retardant is roughly maintained, the result is an increased resistance to flame and smoke propagation and/or an increased resistance to fungal growth.

Figure 6:
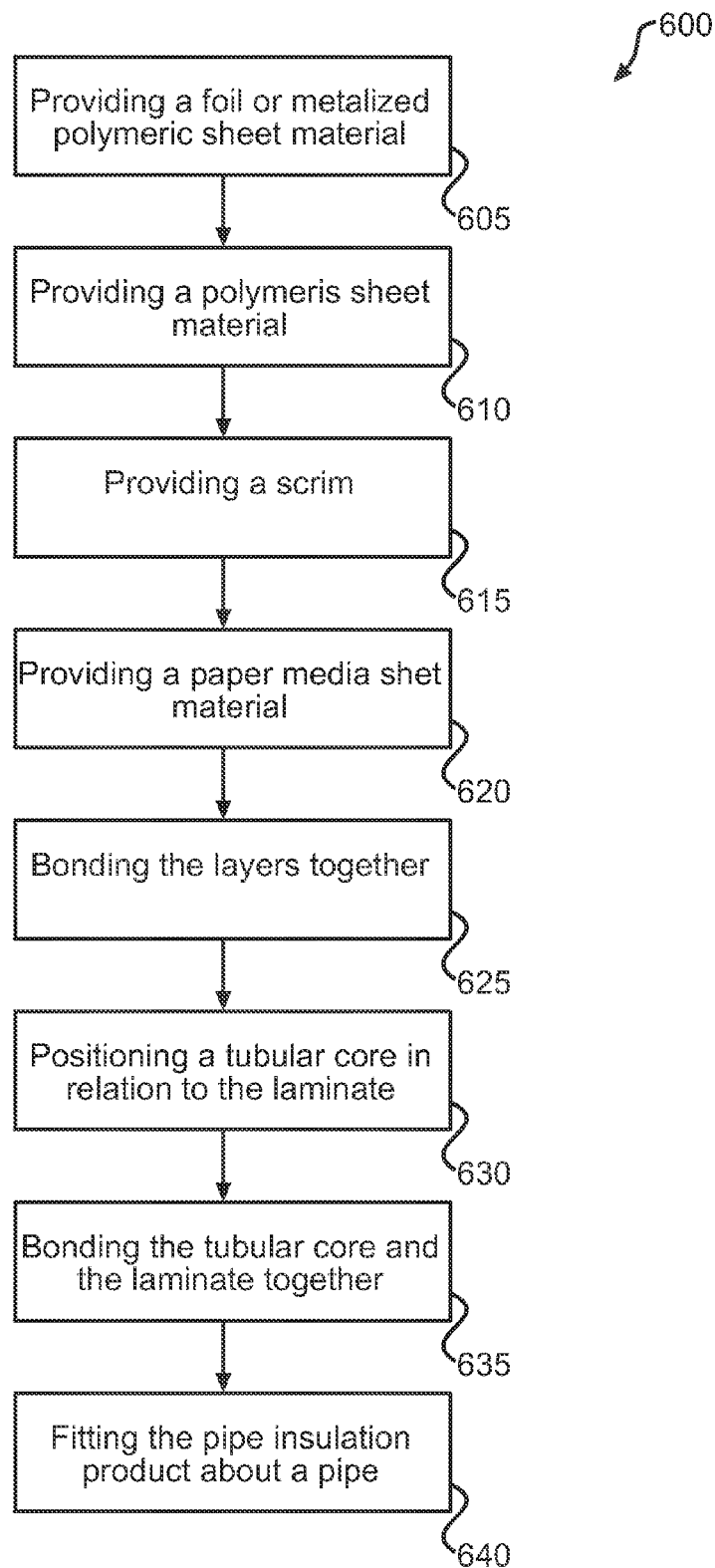
FIG. 6 is a flow diagram illustrating a method for manufacturing a pipe insulation product.

FIG. 6 illustrates a flow diagram 600 of a method for manufacturing a pipe insulation product according to one embodiment of the present invention. At block 605, a foil or metallized polymeric sheet may be provided. The foil or metallized polymeric sheet may form an inner layer of the laminate and may provide a fluid vapor barrier to minimize fluid vapor transmission through the laminate. At block 610, a polymeric sheet material may be provided. The polymeric sheet material may form an outer exposed layer of the laminate. The laminate may include a closure flap that is configured to adhesively seal opposite sides of the laminate jacket so that the laminate forms a hollow cylindrical tube.

At block 615, a scrim may be provided. The scrim may include a mesh of a plurality of fibers and may be positioned between the foil or metallized polymeric sheet and the polymeric sheet outer layer. At block 620, a paper media sheet material may be provided. Preferably, the paper media sheet material is between the range of 25 and 35 pounds per 3000 square feet to provide greater closure flap adhesive seal integrity without degrading one or more beneficial properties of the laminate. At block 625, the foil or metallized polymeric sheet material, the scrim, the paper media sheet material, and the polymeric sheet material may be bonded together via an adhesive material to form the laminate jacket.

At block 630 a tubular core of insulating material may be positioned relative to the laminate so that the tubular core can be wrapped or encased within the laminated. At block 635, the laminate and tubular core may be bonded together to form the pipe insulation product. The pipe insulation product may be flexible so that the tubular core and laminate can be opened, placed about a pipe, and closed without degrading the laminate jacket. At block 640, the pipe insulation product may be fitted about a pipe to insulate and/or protect the pipe as described previously.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A pipe insulation product comprising:
   a tubular core of insulating material, the tubular core comprising:
      a length and a longitudinal axis;
      a substantially cylindrical outer surface;
      a substantially cylindrical inner surface; and
      a wall extending between the cylindrical outer surface and the cylindrical inner surface, the wall of the tubular core having a radially extending thickness, the wall of the tubular core having a slit extending completely there through, the slit extending parallel to the longitudinal axis of the tubular core for the length of the tubular core;
   a laminate that is roughly rectangular in shape and that is coextensive with and bonded to the substantially cylindrical outer surface of the tubular core and flexible so that the tubular core and laminate can be opened, placed about a pipe, and closed without degrading the laminate, the laminate comprising:
      a polymeric film sheet forming an outer exposed layer of the laminate;
      a foil or metallized polymeric film sheet, wherein the foil or metallized polymeric film sheet provides a fluid vapor barrier to minimize fluid vapor transmission through the laminate;
      a scrim comprising a mesh of a plurality of fibers;
      a paper media sheet, wherein the paper media sheet is between the range of 20 and 40 pounds per 3000 square feet; and
      an adhesive that bonds the polymeric film sheet, the foil or metallized polymeric film sheet, the scrim, and the paper media sheet together to form the laminate;
   wherein:
      the laminate comprises a closure flap configured to adhesively seal opposite sides of the laminate so that the laminate forms a substantially cylindrical tube with at least a portion of the tubular core enclosed therein; and
      the paper media sheet between the range of 20 and 40 pounds per 3000 square feet provides greater closure flap seal integrity without significantly reducing one or more beneficial properties of the laminate.

2. The pipe insulation product of claim 1, wherein the one or more beneficial properties comprise one or more properties selected from the group consisting of:
   puncture resistance;
   tensile strength in a circumferential direction;
   tensile strength in a longitudinal direction;
   handling damage resistance;
   fire and smoke propagation resistance; and
   mold, mildew, or fungal growth resistance.

3. The pipe insulation product of claim 1, wherein the paper media sheet is between the range of 27 and 33 pounds per 3000 square feet.

4. The pipe insulation product of claim 1, wherein
   the foil or metallized polymeric film sheet forms an inner layer of the laminate;
   the foil or metallized polymeric film sheet is bonded to the substantially cylindrical outer surface of the tubular core, and
   the scrim and paper media sheet are positioned between the foil or metallized polymeric film sheet and the polymeric film sheet.

5. The pipe insulation product of claim 1, wherein the paper media sheet comprises kraft paper.

6. The pipe insulation product of claim 1, wherein the polymeric film sheet comprises a material selected from the group consisting of:
   polypropylene;
   polyethylene;
   polyvinyl chloride;
   vinyl;
   saran;
   polyethylene terephthalate; and
   thermoplastic polyolefin.

7. A method for producing a roughly rectangular laminate jacket for a pipe insulation product, the method comprising:
   providing a foil or metallized polymeric sheet material, the foil or metalized polymeric sheet material forming an inner layer of the laminate that provides a fluid vapor barrier to minimize fluid vapor transmission through the laminate, the foil or metallized polymeric sheet material comprising:
      a length,
      a width,
      a first face, and
      a second face, wherein the length and width form an area that define the first face and the second face;
   providing a polymeric sheet material, wherein the polymeric sheet material is coextensive with the second face and the polymeric sheet material forms an outer exposed layer of the laminate;
   providing a scrim comprising a mesh of a plurality of fibers, wherein the scrim is substantially coextensive with the second face;
   providing a paper media sheet material, wherein:
      the scrim and paper media sheet material are positioned between the foil or metallized polymeric film sheet and the polymeric film sheet,
      the paper media sheet material is substantially coextensive with the second face, and
      the paper media sheet material is between the range of 20 and 40 pounds per 3000 square feet; and
   bonding, via an adhesive material, the foil or metallized polymeric sheet material, the scrim, the paper media sheet material, and the polymeric sheet material together to form the laminate jacket;
   wherein:

the laminate jacket comprises a closure flap configured to adhesively seal opposite sides of the laminate jacket so that the laminate jacket forms a hollow cylindrical tube; and the paper media sheet material between the range of 20 and 40 pounds per 3000 square feet provides greater closure flap adhesive seal integrity without significantly degrading one or more beneficial properties of the laminate.

8. The method for producing a laminate jacket as in claim 7, the method further comprising:

positioning a tubular core of insulating material directly adjacent the first face of the foil or metallized polymeric sheet material, wherein the tubular core comprises:
- a length and a longitudinal axis;
- a substantially cylindrical outer surface, the substantially cylindrical outer surface comprising a surface area that is roughly equivalent to the area of the first face;
- a substantially cylindrical inner surface; and
- a wall extending between the cylindrical outer surface and the cylindrical inner surface; the wall comprising:
  - a radially extending thickness; and
  - a slit extending from the cylindrical outer surface to the cylindrical inner surface and extending parallel to the longitudinal axis of the tubular core for the length of the tubular core; and bonding, via an adhesive material, the tubular core of insulating material with the first face of the foil or metallized polymeric sheet material to form the pipe insulation product, wherein the pipe insulation product is flexible so that the tubular core and laminate jacket can be opened, placed about a pipe, and closed without degrading the laminate jacket.

9. The method for producing a laminate jacket as in claim 7, wherein the paper media sheet is between the range of 27 and 33 pounds per 3000 square feet.

10. The method for producing a laminate jacket as in claim 7, wherein the polymeric film sheet comprises a material selected from the group consisting of:
- polypropylene;
- polyethylene;
- polyvinyl chloride;
- vinyl;
- saran;
- polyethylene terephthalate; and
- thermoplastic polyolefin.

11. The method for producing a laminate jacket as in claim 8, further comprising:

flexing the tubular core and laminate jacket to open the laminate jacket and tubular core;

placing the laminate jacket and tubular core about the pipe; and closing the laminate jacket and tubular core about the pipe by applying pressure to the closure flap to adhesively seal the opposite sides of the laminate jacket.

12. An insulated pipe product comprising:

a hollow roughly cylindrical pipe with a pipe insulation product fitted about the pipe, wherein the pipe comprises an outer diameter, and wherein the pipe insulation product comprises:
- a tubular core of insulating material, the tubular core comprising:
  - a length and a longitudinal axis;
  - a substantially cylindrical outer surface;
  - a substantially cylindrical inner surface that corresponds to the outer diameter of the pipe; and
  - a wall extending between the cylindrical outer surface and the cylindrical inner surface, the wall of the tubular core having a radially extending thickness and a slit extending completely there through, the slit extending parallel to the longitudinal axis of the tubular core for the length of the tubular core;
- a laminate that is roughly rectangular in shape and that is coextensive with and bonded to the substantially cylindrical outer surface of the tubular core and flexible so that the tubular core and laminate can be opened, placed about the pipe, and closed without degrading the laminate, the laminate comprising:
  - a polymeric film sheet forming an outer exposed layer of the laminate;
  - a foil or metallized polymeric film sheet, wherein the foil or metallized polymeric film sheet provides a fluid vapor barrier to minimize fluid vapor transmission through the laminate;
  - a scrim comprising a mesh of a plurality of fibers;
  - a paper media sheet, wherein the paper media sheet is between the range of 20 and 40 pounds per 3000 square feet; and
  - an adhesive that bonds the polymeric film sheet, the foil or metallized polymeric film sheet, the scrim, and the paper media sheet together to form the laminate;
wherein:
- the laminate comprises a closure flap configured to adhesively seal opposite sides of the laminate so that the laminate forms a substantially cylindrical tube with at least a portion of the tubular core enclosed therein; and
- the paper media sheet between the range of 20 and 40 pounds per 3000 square feet provides greater closure flap seal integrity without significantly degrading one or more beneficial properties of the laminate.

13. The insulated pipe product of claim 12, wherein the paper media sheet is between the range of 27 and 33 pounds per 3000 square feet.

14. The insulated pipe product of claim 12, wherein
the foil or metallized polymeric film sheet forms an inner layer of the laminate;
the foil or metallized polymeric film sheet is bonded to the substantially cylindrical outer surface of the tubular core, and
the scrim and paper media sheet are positioned between the foil or metallized polymeric film sheet and the polymeric film sheet.

15. The insulated pipe product of claim 12, wherein the one or more beneficial properties comprise one or more properties selected from the group consisting of:
- puncture resistance;
- tensile strength in a circumferential direction;
- tensile strength in a longitudinal direction;
- handling damage resistance;
- fire and smoke propagation resistance; and
- mold, mildew, or fungal growth resistance.

16. A roughly rectangular laminate for a pipe insulation product comprising:
- a polymeric film sheet forming an outer exposed layer of the laminate;
- a foil or metallized polymeric film sheet, wherein the foil or metallized polymeric film sheet provides a fluid vapor barrier to minimize fluid vapor transmission through the laminate;
- a scrim comprising a mesh of a plurality of fibers;

a paper media sheet that is between the range of 20 and 40 pounds per 3000 square feet; and an adhesive that bonds the polymeric film sheet, the foil or metallized polymeric film sheet, the scrim, and the paper media sheet together to form the laminate;

wherein:

the laminate comprises a closure flap configured to adhesively seal opposite sides of the laminate so that the laminate forms a substantially cylindrical tube; and the paper media sheet between the range of 20 and 40 pounds per 3000 square feet provides greater closure flap seal integrity without significantly degrading one or more beneficial properties of the laminate.

17. The roughly rectangular laminate of claim 16, wherein the paper media sheet is between the range of 27 and 33 pounds per 3000 square feet.

18. The roughly rectangular laminate of claim 16, wherein the paper media sheet comprises kraft paper.

19. The roughly rectangular laminate of claim 16, wherein the foil or metallized polymeric film sheet forms an inner layer of the laminate; and the scrim and paper media sheet are positioned between the foil or metallized polymeric film sheet and the polymeric film sheet.

20. The roughly rectangular laminate of claim 16, wherein the polymeric film sheet comprises a material selected from the group consisting of:

polypropylene;
polyethylene;
polyvinyl chloride;
vinyl;
saran;
polyethylene terephthalate; and
thermoplastic polyolefin.

* * * * *